(12) United States Patent
Gil Mollà

(10) Patent No.: US 9,909,558 B2
(45) Date of Patent: Mar. 6, 2018

(54) INSTALLING BLADES IN A WIND TURBINE AND WIND TURBINE LIFTING SYSTEMS

(71) Applicant: ALSTOM RENEWABLE TECHNOLOGIES, Grenoble (FR)

(72) Inventor: Isaac Gil Mollà, Nantes (FR)

(73) Assignee: ALSTOM Renewable Technologies, Grenoble (FR)

( * ) Notice: Subject to any disclaimer, the term of this patent is extended or adjusted under 35 U.S.C. 154(b) by 250 days.

(21) Appl. No.: 14/859,119

(22) Filed: Sep. 18, 2015

(65) Prior Publication Data

US 2016/0090961 A1 Mar. 31, 2016

(30) Foreign Application Priority Data

Sep. 26, 2014 (EP) .................................... 14382371

(51) Int. Cl.
*F03D 11/00* (2006.01)
*F03D 1/00* (2006.01)
(Continued)

(52) U.S. Cl.
CPC ........... *F03D 1/001* (2013.01); *F03D 1/0608* (2013.01); *F03D 1/0658* (2013.01); *F03D 13/10* (2016.05);
(Continued)

(58) Field of Classification Search
CPC ........ F03D 13/10; F03D 13/40; F03D 1/0608; F03D 1/0658; Y02P 70/523;
(Continued)

(56) References Cited

U.S. PATENT DOCUMENTS 7,165,941 B2 * 1/2007 Wobben ................ F03D 1/0658
416/144
2009/0159549 A1 * 6/2009 Trede ...................... B66C 1/108
212/270
(Continued)

FOREIGN PATENT DOCUMENTS

EP 2 434 142 3/2012
EP 2 650 537 10/2013
(Continued)

OTHER PUBLICATIONS

European Search Report for application No. EP 14 382371, dated Apr. 22, 2015, 5 pgs.

*Primary Examiner* — Christopher Verdier
(74) *Attorney, Agent, or Firm* — Dority & Manning, P.A.

(57) ABSTRACT

Methods for installing blades of a wind turbine are provided. The method comprises: providing a blade holder, wherein the blade holder comprises a connection element adapted to be attached to a mounting surfaces and a lifting equipment attachment, the blade holder being provided with a steering mechanism. Then, the blade holder is attached to the blade. The blade holder is hoisted with the blade towards the rotor hub with lifting equipment. The blade holder is attached to the mounting surface of the hub using the connection element. The rotor hub is rotated using the weight of the blade holder and the blade to a first desired position for mounting the blade to the rotor hub. The blade holder is detached from the hub. Then, the blade may be mounted to the rotor hub. A wind turbine blade holder for holding a blade and for use in lifting the blade is also provided.

9 Claims, 4 Drawing Sheets

(51) Int. Cl.
*F03D 1/06* (2006.01)
*F03D 13/10* (2016.01)

(52) U.S. Cl.
CPC ......... *F05B 2230/61* (2013.01); *Y02E 10/721* (2013.01); *Y02P 70/523* (2015.11)

(58) Field of Classification Search
CPC .......... F05B 2230/61; F05B 2230/6102; F05B 2240/916; B23P 11/00; B25B 11/00; Y10T 29/4998; Y02E 10/728; B66C 23/207; B66C 23/18; B66C 23/20; E04H 12/00; E04H 12/342; E04H 12/34; E04H 12/344
USPC .......................................................... 29/559
See application file for complete search history.

(56) References Cited

U.S. PATENT DOCUMENTS

2010/0254813 A1* 10/2010 Dawson ................ B66C 23/207
416/146 R
2013/0074335 A1* 3/2013 Amano .................... F03B 3/06
29/889
2016/0090962 A1* 3/2016 Gil Moll ............... F03D 1/0658
416/144

FOREIGN PATENT DOCUMENTS

| WO | WO 2011/064659 | 6/2011 |
| WO | WO 2014/076825 | 5/2014 |

\* cited by examiner

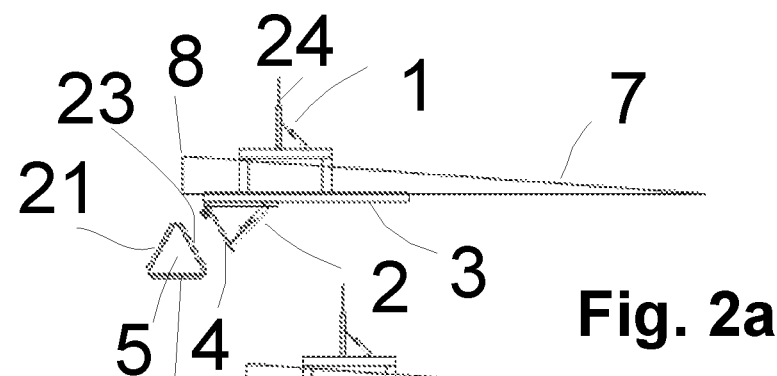
Fig. 2a
Fig. 2b
Fig. 2c
Fig. 2d
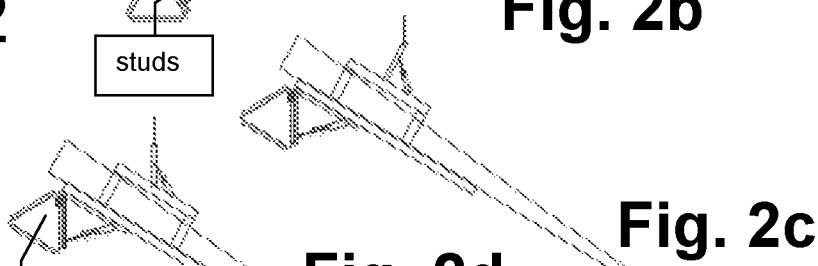
Fig. 2e
Fig. 2f
Fig. 2g
Fig. 2h

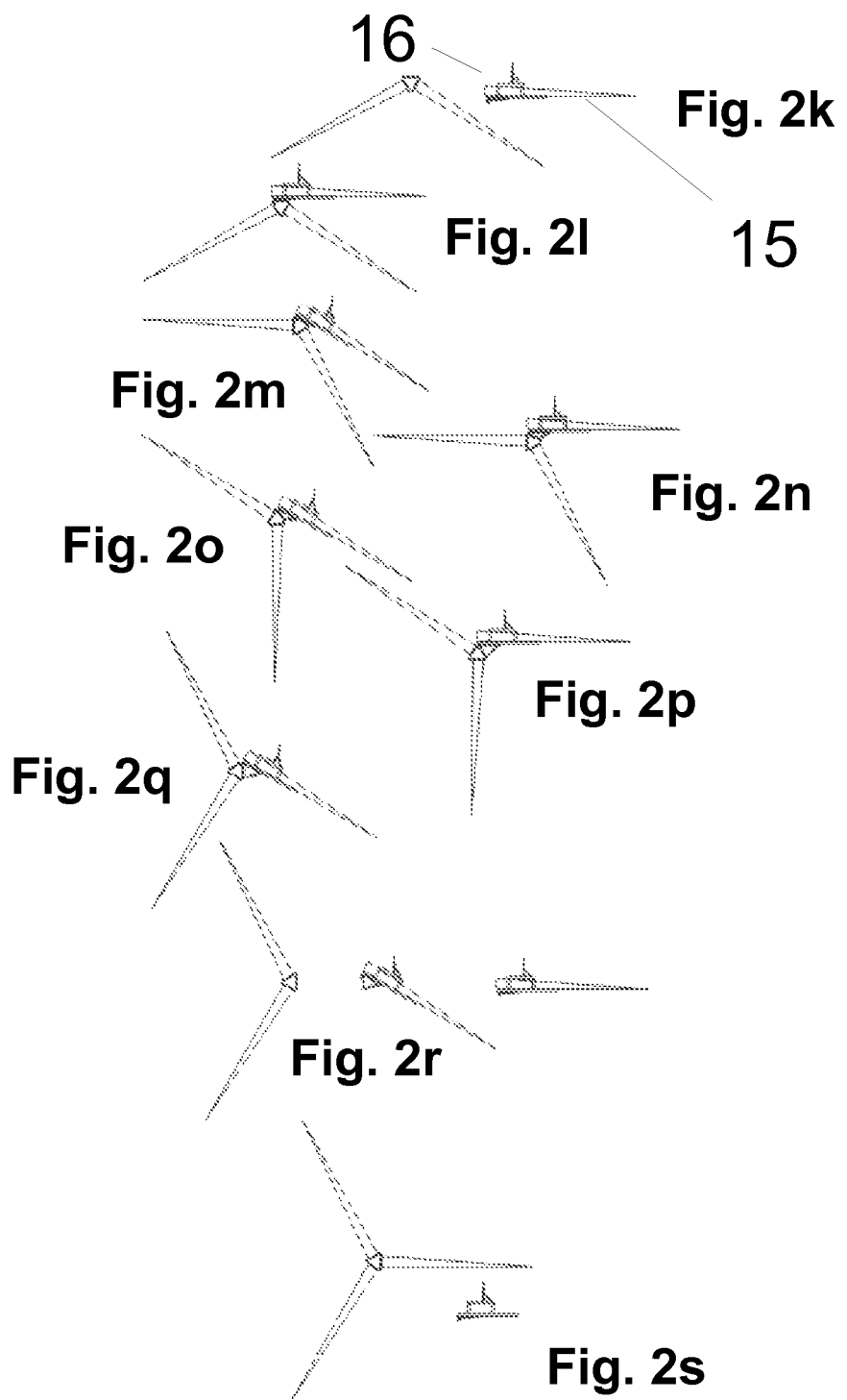

INSTALLING BLADES IN A WIND TURBINE AND WIND TURBINE LIFTING SYSTEMS

The present disclosure relates to methods for installing a blade in a wind turbine and wind turbine lifting systems.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

During installation, one or more blades are to be mounted to the wind turbine hub. The hub generally comprises a plurality of annular mounting flanges with openings. The blade can comprise a plurality of fasteners, such as bolts, or pins or studs at its blade root. During installation, these fasteners are to be fitted into the openings in the mounting flanges. The hub may additionally have further surfaces prepared for attachment of a component, lifting or manipulation of the hub.

The blades may be installed in a variety of ways, e.g. in a substantially vertical manner or substantially horizontally or at other inclined angles. Particularly, in offshore wind turbines, mounting a blade from above the hub may be very complicated, or at least require an enormous crane and jack-up barge. Such an installation method may thus be very expensive and depending on the depth of the sea, blade and rotor size may simply be impossible.

It is known to hoist a complete rotor assembly, i.e. the hub with blades, and mount it to e.g. the nacelle. But in order to mount a complete rotor assembly, a large surface area is required, which is typically not available in the case of offshore wind turbines.

It is further known to mount an incomplete rotor assembly on the nacelle, e.g. the hub with two blades, and subsequently mount the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these operations, the prevailing wind speed has to be below a predetermined value for a prolonged period time. The period of time depends on the expected length of the installation step and a safety factor to be taken into account.

During certain seasons, windows of several hours in which the wind does not reach the predetermined value may not be available very often. In practice, this may mean that personnel and maintenance equipment including e.g. expensive cranes and jack-up barges may be in stand-by during days or even weeks. This can represent an enormous cost.

It is known to mount each of the plurality of blades substantially horizontally or substantially vertically. This means that individual installation steps may require less time and may be performed at higher winds, thus increasing the time windows available for installation. However, such methods require rotation of the hub between the mounting of one blade and another. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub. The corresponding torque may thus be very high.

The torque may be delivered using the gearbox (when present) with an external power supply for rotating the rotor. Such a system may be used in combination with a locking pin for maintaining the rotor in a desired position for installation. This is not possible in case of directly driven wind turbines as no gearbox is provided between the rotor and generator. Even though the generator may be suitable for operating as a motor, it will generally not be able to deliver the required torque to rotate the hub, especially when the hub is unbalanced, i.e. when at least one blade, but not all the blades, have been mounted.

It is an object of the present disclosure to provide methods and systems that at least partially reduce one or more of the aforementioned drawbacks leading to improved methods of installing wind turbine blades especially suitable for direct drive wind turbines and offshore direct drive wind turbines.

SUMMARY

In a first aspect, a method for installing a blade of a wind turbine is provided. The wind turbine comprises a rotor hub positioned on a wind turbine tower such that the rotor hub is configured to rotate around an axis, the rotor hub comprising mounting surfaces. The method comprises: providing a blade holder for holding a blade, wherein the blade holder comprises a connection element adapted to be attached to the mounting surfaces and a lifting equipment attachment. The blade holder is provided with a first steering mechanism adapted to control an orientation of the blade holder with respect to the lifting equipment attachment. The method further includes providing lifting equipment for lifting the blade holder. Then, the blade holder is attached to the blade. The lifting equipment is connected to the blade holder using the lifting equipment attachment. The blade holder is hoisted with the blade towards the rotor hub with the lifting equipment. The blade holder can then be attached to a mounting surface of the hub using the connection element. The rotor hub is then rotated using the weight of the blade holder and the blade to a first desired position for mounting the blade to the rotor hub. The blade holder can then be detached from the hub. Then, the blade may be mounted to the rotor hub.

It has been found that the use of the blade holder in order to rotate the rotor during the installation of a blade in a wind turbine may be an advantage. The weight of the blade holder and the blade may provide the torque to rotate the rotor hub. As a consequence, one or more blades may be mounted to the rotor hub in a desired position e.g. horizontally and the need to reach positions for installing the blades higher than the hub may be avoided. Furthermore, the need of auxiliary tools, e.g. a wind turbine generator operated by a motor or an auxiliary gear motor to rotate the rotor, may be eliminated. In addition, the blades may be mounted one by one, at higher wind speeds. More time windows for such installations may thus be available, thus shortening installation time and reducing installation cost.

The blade holder may be provided with a connection element adapted to be attached to the mounting surfaces of the rotor hub. The connection element may be provided with a steering mechanism. In this way, different angular configurations of the blade holder may be achieved, and therefore the installation and the removal of the blade holder (and thus the blade) at different angles may be obtained.

According to one embodiment, a locking system for locking the hub once the first desired position for mounting the blade of the rotor hub is achieved may be provided. This may be performed by manually pushing a piston, a rod, a bolt or a similar element into a corresponding hole in the rotor hub. Additionally or alternatively, some additional systems, e.g. wind turbine generator operated as a motor or an auxiliary gear motor, may be operated for retaining the hub in a certain position.

In a second aspect, a wind turbine blade holder for holding a blade is provided. The wind turbine blade holder comprises a connection element adapted to be attached to a mounting surface of a wind turbine rotor hub and a lifting equipment attachment.

In some examples, the blade holder may be provided with a first steering mechanism for controlling an orientation of the blade holder with respect to the lifting equipment attachment and/or a second steering mechanism for controlling an orientation of the blade holder with respect to the connection element to be connected to the hub.

The first and/or second steering mechanisms may comprise pneumatic, hydraulic, or electric actuators, e.g. a hydraulic piston. The first steering mechanism may also be achieved by having the lifting equipment attachment being displaceable along e.g. a rail of the blade holder. By changing the position of the lifting equipment attachment with respect to the center of gravity of the blade holder (with blade), a reorientation of the blade holder can be achieved.

This way, for example, the second steering mechanism may perform the repositioning of the blade holder in a desired position e.g. horizontal during the installation of a blade. Thus, the blade holder (and thus the blade) may apply the necessary torque to the rotor hub. As a consequence, the rotation of the rotor hub to a desired position may be achieved.

According to a still further aspect, a wind turbine comprising a rotor hub, a plurality of blades mounted on the hub and a blade lifting system substantially as described above is provided.

BRIEF DESCRIPTION OF THE DRAWINGS

Non-limiting examples of the present disclosure will be described in the following, with reference to the appended drawings, in which:

FIGS. 2a-2h schematically illustrate a sequence of situations that may occur during the performance of a method for installing a first blade of a wind turbine according to an example;

FIGS. 2k-2s schematically illustrate a sequence of situations that may occur during the performance of a method for installing a third blade of a wind turbine according to an example.

DETAILED DESCRIPTION

Figure 1:
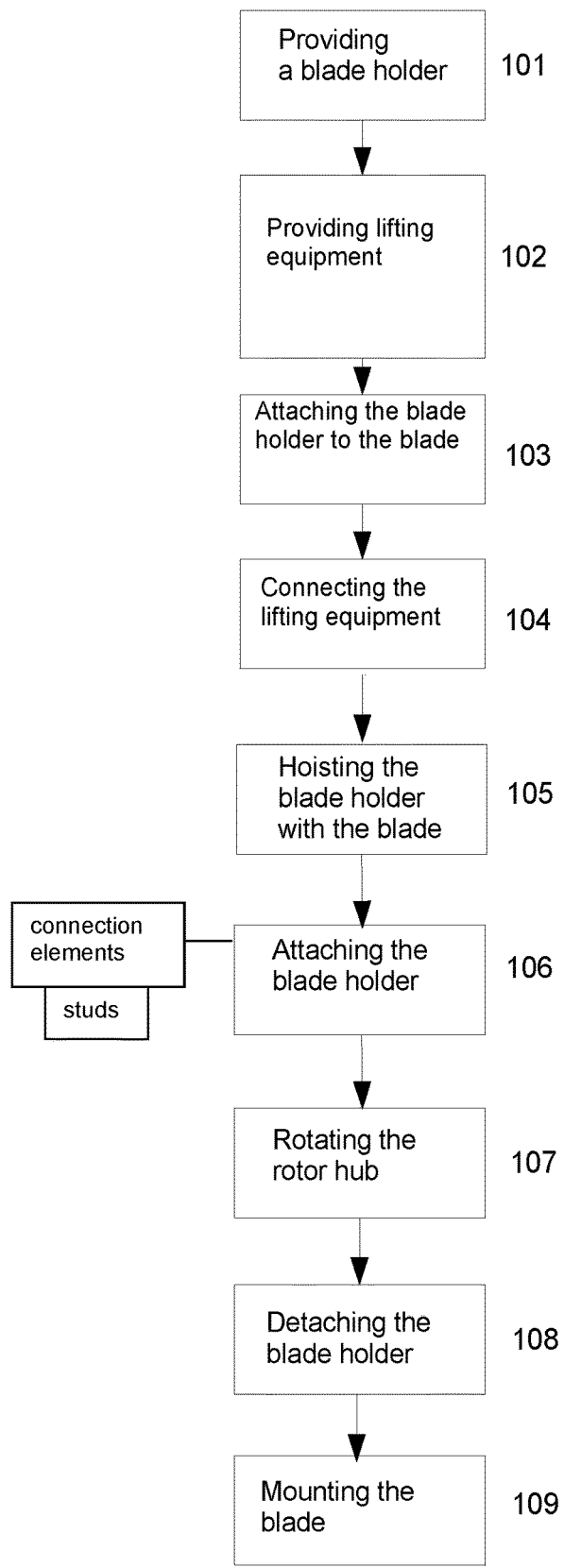
FIG. 1 is an illustration of a block diagram describing an example of a method of installing a blade in a wind turbine.

The FIG. 1 is an illustration of a block diagram describing an example of a method of installing a blade in a wind turbine. For the sake of simplicity, references to times indicated by an "imaginary" clock may also be included in descriptions relating to FIG. 1 (and further figures). The references to times may be used to indicate approximate positions of the blade holder and/or the blade holder and the blade by considering the blade holder or the blade holder and the blade as an hour hand of the "imaginary" clock. Thus, for example, reference may be made to the blade holder or the blade holder and the blade pointing to 6 o'clock to indicate that the blade holder or the blade holder and the blade is vertically pointing downwards.

At block 101, a blade holder may be provided. The blade holder may be e.g. a device for clamping a blade or a lifting beam with one or more controllable slings around the blade. The blade holder may be provided with a first steering mechanism adapted to control an orientation of the blade holder with respect to the lifting equipment attachment. The first steering mechanism may allow the installation and the removal of the blade at different angles e.g. one position between 9 o'clock and 7 o'clock and between 3 o'clock and 5 o'clock. The actuation of the steering mechanism may be operated by electric current, hydraulic fluid pressure, or pneumatic pressure, although other ways are possible as well.

At block 102, lifting equipment may be provided such as e.g. a crane. The lifting equipment may also be provided with a steering mechanism. At block 103, the blade holder may be attached to the blade. The blade may comprise a blade root portion e.g. a blade flange with fasteners for eventually mounting the blade to a rotor hub.

At block 104, the lifting equipment may further be connected to the blade holder. At block 105, the blade holder (and thus the blade) may be hoisted towards the rotor hub. At block 106, the blade holder may be attached to a mounting surface of the hub using a connection element. Furthermore, the connection element may be provided with one or more fasteners e.g. studs or bolts. The fasteners may be situated at a proximal end of the connection element, although some other positions may be possible. The fasteners may allow a strong connection between the connection element and the hub, and thus the torque to rotate the rotor hub may easily be borne.

At block 107, the rotor hub may be rotated using the weight of the blade holder and the blade to a first desired position for mounting the blade to the rotor hub. At block 108, the blade holder may be detached from the hub. Then, the blade may be mounted to the hub at block 109.

FIGS. 2a-2h schematically illustrate a sequence of situations that may occur during the performance of a method for installing a first blade of a wind turbine according to an example. Same reference numbers denote the same elements. The method is described below with reference to the sequences of situations illustrated by FIGS. 2a-2h.

In FIG. 2a, the rotor hub 5 may be mounted on the nacelle (not shown) in such a way that the rotor hub 5 is rotatable around an axis with respect to the nacelle. The rotor hub is shown comprising a first mounting surface 23 adapted to receive the blade root of a first blade, a second mounting surface 22 adapted to receive the blade root of a second blade, and a third mounting surface 21 adapted to receive the blade root of a third blade. Each of these mounting surfaces 23, 22, 21 may comprise a pitch system (not shown) for rotating the blade to be mounted to the mounting surfaces. The rotation may be about a pitch axis i.e. a longitudinal axis of the blade when mounted to the hub.

The pitch system may be a "standard" pitch system, either hydraulic or electromechanical. In some implementations, a more powerful pitch system may be provided.

The blade holder 3 of FIG. 1 is shown having a first steering mechanism 1 and a second steering mechanism 2.

The blade holder 3 may comprise a lifting equipment attachment 24 configured to be attached to a lifting equipment (not shown). The blade holder 3 may be provided with a connection element 4 e.g. studs or bolts configured to be attached to a mounting surface.

The first steering mechanism 1, e.g. a levelling system provided with a hydraulic cylinder, may be located at the upper part of the blade holder 3. The first steering mechanism may be attached between the lifting equipment attachment 24 and an upper portion of the blade holder 3. The first steering mechanism 1 may be configured to rotate the blade holder at different angles with respect to a lifting equipment attachment 24. This way, the blade may be installed at different angles (with respect to a horizontal plane).

The second steering mechanism 2 may be e.g. a levelling system provided with a hydraulic cylinder and may be located at the lower part of the blade holder 3. The second steering mechanism may be attached between the connection element 4 and a lower support of the blade holder 3. The second steering mechanism may be configured to rotate the blade holder 3 with respect to the connection element 4. This way, once the blade holder 3 is attached to the rotor hub 5 using the connection element 4, the blade holder 3 (and thus the blade 7) may be repositioned in a horizontal position. Therefore, a torque may be induced to the rotor hub 5 and the rotation of the rotor hub 5 may be achieved.

The hub may be configured to carry a plurality of blades. Only one blade 7 is shown in FIG. 2a.

The FIG. 2a illustrates an initial situation. In this initial situation, the rotor hub 5 may be situated in a position which may not be appropriate for installing the first blade 7. Such a situation in which mounting surfaces 21, 22 and 23 are arranged so as to receive blades in a "bunny ears" configuration may typically result from lifting the hub towards the top of the tower or nacelle.

A way to define these positions is with reference to an angular position of the hub. The 0° position for a blade may be regarded as a position in which it is arranged substantially vertically, pointing upwards. The mounting surfaces are thus arranged in the specific situation shown at 60° (mounting surface 23), 180° (mounting surface 22) and 300° (or −60° for mounting surface 21).

The blade holder 3 may be attached to the first blade 7. The lifting equipment (not shown) may be attached to the blade holder 3 using the lifting equipment attachment 24. The blade holder 3 and the blade 7 may be brought near the rotor hub using the lifting equipment. The blade holder 3 (and thus the blade 7) may be situated in a substantially horizontal position using the first steering mechanism 1 e.g. a levelling system provided with a hydraulic cylinder.

In FIG. 2b, the blade holder 3 connection element 4 is attached to the first blade mounting surface 23 of the rotor hub 5. In this particular example, the connection element 4 is suited for being connected to the mounting surfaces of the blade. This way, there is no need for extra mounting surfaces of any type at the rotor hub for holding the connection element 4.

In FIGS. 2c and 2d, the rotor hub 5 is rotated in a clockwise direction to a desired position using the weight of the blade holder 3 and the first blade 7. The weight of the blade holder 3 and the blade 7 induces a torque (due only to weight loads) in the rotor hub 5. Therefore, no additional systems, e.g. a wind turbine generator operated by a motor, or an auxiliary gear motor, are necessary for acting on the hub. Once the desired position for mounting the first blade 7 is achieved, the rotor hub 5 may be blocked using a locking mechanism, e.g. an actuator for selectively switching the hub between an engaged position for rotatably fixing the hub to an axle and a disengaged position for freeing rotation of the hub on the axle. The locking mechanism (not shown) of the hub may ensure that the hub 5 remains in the desired position during the entire mounting operation of a first blade 7.

In an alternative method, a first rotation of the hub (not carrying any blades) may be carried out using a generator for the wind turbine, or some auxiliary driving equipment.

In FIG. 2e, the connection element 4 is detached from the first blade mounting surface 23 of the rotor hub 5. The blade holder 3 (and thus the blade 7) may be separated from the rotor hub 5 using the lifting equipment (not shown).

In FIG. 2f, the blade holder 3 (and thus the first blade 7) is rotated to a substantially horizontal position using the first steering mechanism 1, e.g. a levelling system provided with a hydraulic cylinder. The first steering mechanism 1 may be configured to install the first blade at an angle, e.g. a position between 9 and 7 o'clock or between 3 and 5 o'clock.

In FIG. 2g, the blade holder 3 (and thus the first blade 7) is brought into contact with the rotor hub 5 using the lifting equipment (not shown). In this way, the blade root portion 8 of the first blade may be attached to the first blade mounting surface 23 of the rotor hub 5. The blade 7 may thus be mounted horizontally. Mounting blades in a substantially horizontal manner is generally a preferred option since such an operation may be carried out at higher wind speeds than other operations, and importantly there is no need to lift a blade at a substantial height above the hub. But other non-horizontal orientations may be possible depending on e.g. the particular configuration of the wind turbine.

The FIG. 2h illustrates the first blade 7 mounted to the first blade mounting surface 23 (and thus the rotor hub 5). The locking mechanism of the rotor hub may be disconnected. This way, once the first blade 7 is mounted, the rotor hub 5 may rotate in a clockwise direction e.g. towards a position in which the second blade mounting surface is arranged so as to receive a blade in a substantially horizontal manner (i.e. at 270°). At that point, the locking mechanism can be activated again.

Alternatively, the locking mechanism (not shown) of the rotor hub 5 may be maintained activated, thus the rotor hub 5 may remain in a position wherein mounting surface 23 is at the 90° position. The mounting surface 22 is then at the 210° position, which could also be appropriate to install the second blade using a suitable blade holder. The blade holder 3 is detached from the first blade 7. Therefore, the blade holder 3 may be ready for the installation of a second blade.

Alternatively, the hub could be allowed to move and the locking mechanism (not shown) of the rotor hub 5 could be reactivated e.g. when the rotor hub 5 is in a position wherein mounting surface 23 is at the 120° position. The mounting surface 21 is then at the 240° position, which could also be appropriate to install the second blade using a suitable blade holder. The blade holder 3 is detached from the first blade 7. Therefore, the blade holder 3 may be ready for the installation of a second blade.

Figure 2I:
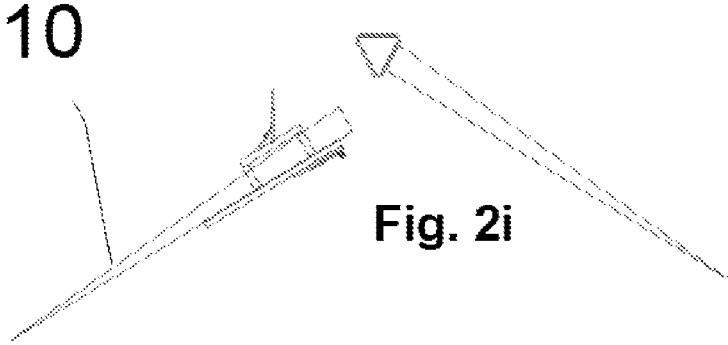
FIGS. 2i-2j schematically illustrate a sequence of situations that may occur during the performance of a method for installing a second blade of a wind turbine according to an example.
Figure 2J:
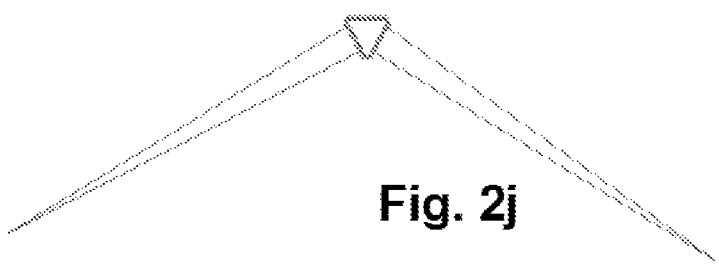

FIGS. 2i-2j schematically illustrate a sequence of situations that may occur during the performance of a method for installing a second blade of a wind turbine according to an example. Prior to this, the hub may be unlocked in order to cancel the locking of the hub occurred in the previous installation of the first blade. In FIGS. 2i-2j, same elements denote the same numbers as described in FIGS. 2a-2h.

The FIG. 2i illustrates a situation in which the rotor hub 5 may be situated in a position which may be appropriate for installing the second blade 10. The blade holder 3 is attached to the second blade 10. The lifting equipment (not shown) is attached to the blade holder 3 using the lifting equipment attachment 24. The blade holder 3 and the second blade 10 may be brought near the rotor hub using the lifting equipment (not shown). The blade holder (and thus the second blade 10) may be situated at the 8 o'clock position using the first steering mechanism, e.g. a levelling system provided with a hydraulic cylinder.

The FIG. 2*j* illustrates the second blade 10 mounted to the second blade mounting surface 22. This way, once the second blade 10 is mounted, the rotor hub 5 is substantially balanced.

FIGS. 2*k*-2*s* schematically illustrate a sequence of situations that may occur during the performance of a method for installing a third blade of a wind turbine according to an example. Prior to this, the hub may be unlocked in order to cancel the locking of the hub occurred in the previous installation of the second blade. In FIGS. 2*k*-2*s*, same elements denote the same numbers as described in FIGS. 2*a*-2*h*.

The FIG. 2*k* illustrates an initial situation for the installation of the third blade. In this initial situation, the rotor hub 5 may be situated in a position which may not be appropriate for installing the third blade 15. In this situation, a crane or other lifting equipment would have to lift the blade to much higher heights in order to mount the blade from above the hub.

According to this example, the blade holder 3 may be attached to the third blade 15. The lifting equipment (not shown) may be attached to the blade holder 3 using a lifting equipment attachment 24. The blade holder 3 and the blade 15 may be brought near the rotor hub 5 using the lifting equipment (not shown). The blade holder 3 (and thus the third blade 15) is situated in a substantially horizontal position using the first steering mechanism, e.g. a levelling system provided with a hydraulic cylinder.

In FIG. 2*l*, the blade holder may comprise a connection element 4 that is attached to the third blade mounting surface 21. This way, the connection element 4 (and thus the blade holder 3 and the third blade 15) is attached to the third blade mounting surface of the rotor hub 5.

In FIG. 2*m*, the rotor hub 5 is rotated in a clockwise direction using the weight of the blade holder 3 and the third blade 15 to a first intermediate position shown in FIG. 2*m*. The first two blades were substantially in equilibrium, but the extra weight of the blade holder 3 and the blade 15 induces a torque (due only to weight loads) in the hub.

Therefore, no additional systems, e.g. a wind turbine generator operated by a motor, or an auxiliary gear motor, may be necessary for rotating the rotor hub 5. Once the first intermediate position is achieved, the rotor hub may be blocked using the locking mechanism, e.g. an actuator for selectively switching the hub between an engaged position for rotatably fixing the hub to an axle and a disengaged position for freeing rotation of the hub.

In FIG. 2*n*, the blade holder 3 (and thus the third blade 15) is rotated to a position substantially horizontal using the second steering mechanism 2. This way, the weight of the blade holder 3 and the third blade 15 again induces a torque (due only to weight loads) in the rotor hub 5.

In FIG. 2*o*, as commented above in the FIG. 2*n*, the extra weight of the blade holder 3 and the third blade 15 may again induce a torque (due only to weight loads) in the hub sufficient to overcome the countertorque caused by the other blades. This way, the rotor hub 5 may be rotated in a clockwise direction using the weight of the blade holder 3 and the third blade 15 to a second intermediate position. Prior to this, the hub may be unlocked to allow rotation of the hub.

In FIG. 2*p*, the rotor hub 3 may again be blocked using the locking mechanism. Once the rotor hub 5 is blocked, the blade holder 3 is rotated to a position substantially horizontal using the second steering mechanism 2, e.g. a levelling system provided with a hydraulic cylinder. This way, the weight of the blade holder 3 and the third blade 15 again induce a torque (due only to weight loads) in the hub.

By repeatedly returning the blade and blade holder upwards, e.g. to a horizontal position, the torque delivered by the weight of the blade may be increased, so that the hub can be rotated further again.

In FIG. 2*q*, the rotor hub 5 may be rotated in a clockwise direction to a desired position using the weight of the blade holder 3 and the third blade 15. The weight of the blade holder 3 and the third blade 15 induces a torque (due only to weight loads) in the hub. Therefore, no additional systems, e.g. a wind turbine generator operated by a motor or an auxiliary gear motor, may be needed for acting on the hub. Once the second desired position for mounting the third blade 15 is achieved, the rotor hub 5 again may be blocked using a locking mechanism e.g. an actuator for selectively switching the hub between an engaged position for rotatably fixing the hub to an axle and a disengaged position for freeing rotation of the hub. The locking mechanism of the hub may ensure that the hub remains in the second intermediate position.

In FIG. 2*r*, the connection element 4 is detached from the third blade mounting surface 21 of the rotor hub 5. The blade holder 3 (and thus the third blade 15) may be separated from the rotor hub 5 using the lifting equipment. The blade holder 3 (and thus the third blade 15) is rotated to a substantially horizontal position using the first steering mechanism 1, e.g. a levelling system provided with a hydraulic cylinder.

In FIG. 2*s*, the blade holder 3 (and thus the third blade 15) is brought into contact with the rotor hub using the lifting equipment. In this way, the third blade root portion 16 of the third blade 15 may be attached to the third blade mounting surface 21 of the rotor hub. The blade is mounted horizontally, although other non-horizontal orientations may be possible depending on, e.g., the particular configuration of the wind turbine.

A wind turbine comprising a rotor hub, a plurality of blades mounted on the hub, and a blade lifting system in accordance with the invention is also provided.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for installing a blade of a wind turbine, the wind turbine comprising a rotor hub positioned on a wind turbine tower such that the rotor hub is configured to rotate around an axis, the rotor hub comprising a mounting surface for the blade, the method comprising:

providing a blade holder for holding the blade, wherein the blade holder comprises a connection element adapted to attach to the mounting surface and a lifting equipment attachment, the blade holder being provided with a first steering mechanism adapted to control an orientation of the blade holder with respect to the lifting equipment attachment;

providing lifting equipment for lifting the blade holder;

attaching the blade holder to the blade;

connecting the lifting equipment to the blade holder using the lifting equipment attachment;

hoisting the blade holder with the blade towards the rotor hub using the lifting equipment;

attaching the blade holder to the mounting surface of the hub using the connection element;

using the weight of the blade holder and the blade, rotating the rotor hub to a first desired position for mounting the blade to the rotor hub;

detaching the blade holder from the hub; and mounting the blade to the rotor hub.

2. The method according to claim 1, further comprising using a locking system to prevent rotation of the rotor hub after rotating the rotor hub to the first desired position for mounting the blade to the rotor hub.

3. The method according to claim 1, further comprising using the first steering mechanism to rotate the blade holder to a substantially horizontal position after detaching the blade holder from the hub.

4. The method according to claim 1, wherein the connection element is provided with one or more studs located at an end of the connection element, the studs being configured to attach to the mounting surface of the hub.

5. The method according to claim 1, further comprising:

attaching the blade holder to a second blade;

hoisting the blade holder with the second blade towards the rotor hub using the lifting equipment; and mounting the second blade to the rotor hub.

6. The method according to claim 5, further comprising, after hoisting the blade holder, rotating the blade holder to an angle of between 0 and 60 degrees with respect to a horizontal plane using the first steering mechanism.

7. The method according to claim 5, wherein the blade holder is provided with a second steering mechanism adapted to control an orientation of the blade holder with respect to the connection element, the method further comprising:

attaching the blade holder to a third blade;

hoisting the blade holder with the third blade towards the rotor hub using the lifting equipment;

attaching the blade holder to a mounting surface for the third blade using the connection element;

using the weight of the blade holder and the third blade, rotating the rotor hub to a first intermediate position for mounting the third blade to the rotor hub;

using a locking mechanism, locking the rotor hub after the rotor hub has reached the first intermediate position;

rotating the blade holder upwards using the second steering mechanism;

releasing the rotor hub from the locking mechanism to allow hub rotation;

using the mass of the blade holder and the third blade, rotating the rotor hub around a hub axis to a second desired position for mounting the third blade to the rotor hub;

detaching the blade holders;

rotating the blade holder to a substantially horizontal position using the first steering mechanism; and mounting the third blade to the rotor hub.

8. A method for mounting a third blade to a rotor hub of a wind turbine already carrying two previously mounted blades, comprising:

providing a blade holder for holding the third blade, wherein the blade holder comprises a connection element adapted to attach to a mounting surface of the rotor hub for the third blade and a lifting equipment attachment, the blade holder being provided with a second steering mechanism adapted to control an orientation of the blade holder with respect to the connection element;

attaching the blade holder to the third blade;

hoisting the blade holder with the third blade towards the rotor hub using lifting equipment;

attaching the blade holder to the mounting surface for the third blade using the connection element;

using the weight of the blade holder and the third blade, rotating the rotor hub to a first intermediate position for mounting the third blade to the rotor hub;

using a locking mechanism, locking the rotor hub after the rotor hub has reached the first intermediate position;

rotating the blade holder upwards using the second steering mechanism;

releasing the rotor hub from the locking mechanism to allow hub rotation;

using the mass of the blade holder and the third blade, rotating the rotor hub around a hub axis to a second desired position for mounting the third blade to the rotor hub;

detaching the blade holder;

rotating the blade holder to a substantially horizontal position using a first steering mechanism; and mounting the third blade to the rotor hub.

9. The method according to claim 8, further comprising, after releasing the rotor hub from the locking mechanism:

using the weight of the blade holder and the third blade, rotating the rotor hub around its axis to a second intermediate position for mounting the third blade to the rotor hub;

using the locking mechanism, locking the hub after the hub has reached the second intermediate position;

rotating the blade holder upwards using the second steering mechanism;

releasing the rotor hub from the locking mechanism to allow hub rotation.

* * * * *